United States Patent [19]

Makoski

[11] Patent Number: 4,824,168
[45] Date of Patent: Apr. 25, 1989

[54] ORGANIZING APPARATUS FOR UMBRELLA STROLLERS

[76] Inventor: Kathyrn J. Makoski, 517 Buckingham Dr., Greensburg, Pa. 15601

[21] Appl. No.: 144,190
[22] Filed: Jan. 15, 1988
[51] Int. Cl.⁴ .............................................. A47C 31/18
[52] U.S. Cl. ..................................... 297/229; 297/191
[58] Field of Search ............... 297/229, 219, 191, 250, 297/230

[56] References Cited

U.S. PATENT DOCUMENTS

| 2,797,743 | 7/1951 | Rodtz | 297/229 |
|---|---|---|---|
| 2,822,968 | 2/1958 | Jackson . | |
| 2,979,098 | 4/1961 | Greaves . | |
| 3,014,759 | 12/1961 | Bing . | |
| 3,078,101 | 2/1963 | Reese | 297/229 |
| 3,479,085 | 11/1969 | Weinstein | 297/191 |
| 4,157,839 | 6/1979 | Lahti et al. | 297/230 |
| 4,273,380 | 6/1981 | Silvestri | 297/229 |
| 4,426,113 | 1/1984 | Schutz | 297/219 |
| 4,518,198 | 5/1985 | Daniels . | |
| 4,536,028 | 8/1985 | Jones et al. . | |
| 4,553,785 | 11/1985 | Duke, Jr. et al. . | |
| 4,655,502 | 4/1987 | Houllis . | |
| 4,671,568 | 7/1987 | Greer . | |
| 4,695,092 | 9/1987 | Hittie | 297/250 |

FOREIGN PATENT DOCUMENTS 2907241  9/1979  Fed. Rep. of Germany ...... 297/191

Primary Examiner—Francis K. Zugel
Attorney, Agent, or Firm—Thomas R. Shaffer

[57] ABSTRACT

An organizing apparatus for an umbrella-type baby stroller provides a plurality of readily accessible pockets. The apparatus has a seat segment which has an elastic strap to attach the apparatus to the seat of the stroller. One or more pockets are provided on a back segment of a fabric body cover sized to fit the stroller. This back segment hangs over a back member of the stroller. Because this back segment hangs at or before the back wheels of the stroller, great weight may be carried by the apparatus without causing the stroller to tip over.

6 Claims, 2 Drawing Sheets

ORGANIZING APPARATUS FOR UMBRELLA STROLLERS

BACKGROUND OF THE INVENTION

1. Field of the Invention

The present invention relates to an organizing apparatus for baby strollers and the like. More specifically, the invention relates to a removable cover for an umbrella-type baby stroller which presents a plurality of readily accessible pockets.

2. Description of the Prior Art

Most parents are well aware of the problems associated with travelling with infants or other small children. Typically, a baby carriage or stroller is used for shopping, short distance transportation or other events where holding the child is impractical. However, transporting the child is only a part of the problem. A variety of items are also generally required to meet the seemingly constant needs of the child. For example, it is not uncommon for a parent or child care provider to also transport baby bottles, baby food, diapers, moist baby wipes, pacifiers, baby toys, bibs and a change of clothes even when only a short excursion is contemplated. Keeping track of these items as well as the personal items of the child care provider is not an easy task especially when all of the items are commingled in a diaper bag and/or a purse.

Even where the diaper bag provides a plurality of pockets to organize the items, it is still difficult to simultaneously carry the bag and push the stroller. A common solution to this problem is to haphazardly hang the diaper bag from the back of the baby stroller. This solution, however, is less than ideal. The pockets of the diaper bag are often inaccessible without removing the bag from the stroller making access to the contents of the diaper bag a difficult and time consuming task. Further, the weight of the bag and its contents hanging from the back of the stroller handles often cause the stroller to tip over when the child is removed from the seat.

One solution to this problem was disclosed in my earlier application Ser. No. 091,446 filed on Aug. 31, 1987. Therein, I disclosed and claimed an organizing apparatus for a baby stroller in which wing portions of a T-shaped covering body are adapted to extend over the sides of the stroller. These wings contain pockets in which various accessories may be carried.

Another solution to this problem is disclosed in U.S. Pat. No. 4,157,839 which teaches the use of a cushion device for a baby carriage which includes a bag-like receptacle positioned behind the back portion of a carriage. The bag-like receptacle may be removably attached to the cushion device. This device, however, fails to include sufficient means to organize all of the child's provisions. Moreover, this device does not include a tuck portion at the intersection of the back segment and the seat segment and does not contain a front pocket into which the front of the stroller is inserted. Furthermore, because the cushion device was claimed to be applicable to all baby carriages, the placement of the bag on some carriages would create an unbalanced weight load causing undesired tipping.

SUMMARY OF THE INVENTION

The present invention provides a solution to the above problems by providing an organizing apparatus for an umbrella-type baby stroller which provides a plurality of readily accessible pockets adapted to hold and organize all of the above identified items and supplies. Further, the present invention provides an organizer which covers and protects the baby stroller. The organizer is designed to carry heavy loads in pockets located substantially above the rear wheels of the stroller and in close proximity to the parent or guardian.

The organizer of the present invention is in the form of a flexible and resilient textile body. The body may be formed from a single piece of fabric or from a number of joined pieces. A quilted fabric body is presently preferred because it provides a soft padded surface for the child. The organizer is removably attached to a baby stroller by suitable strap means. The placement of the strap means is important to assure that the organizer is firmly affixed to the stroller. The organizer is designed to closely conform to the configuration of the stroller to which it is secured so that the stroller may be collapsed into a storage position with the organizer in place. Accordingly, while the organizer of the present invention is readily removable for cleaning and the like, it is anticipated that most users will choose to leave the organizer affixed to the stroller for extended periods of time. By periodically stocking the organizer with necessary supplies, the user may be ready to travel on relatively short notice.

The textile body has a generally rectangular seat segment, sized to cover a seat of a baby stroller. The seat segment has a front portion, a rear portion and a pair of opposite side portions. A plurality of slits are provided in the seat portion to receive a seat belt which is provided on most strollers. The body also has a generally rectangular back segment sized to cover and extend beyond an upper end of a back member of a baby stroller. The back segment has a hanging portion positioned remote from said seat segment and a bottom portion positioned adjacent to the rear portion of the seat segment. The hanging portion hangs down from the back portion of the baby stroller. Optionally, the body may have a pair of wing segments each extending outwardly from and having a top portion positioned adjacent to the opposite sides of the seat segment, as described in my earlier application Ser. No. 091,446 filed Aug. 31, 1987. A strip is sewn around the perimeter of the body to prevent fraying of the fabric and add rigidity to the body.

A pocket member is provided on the front of the seat segment. This pocket member, which is formed by folding the fabric back upon itself before sewing the strip around the body perimeter, is adapted to receive the front end of the stroller seat. An elastic member ensures that the pocket will remain snug around the front edge of the stroller seat.

At least one pocket member is attached to the hanging portion of the back segment. Because the hanging portion of the back segment is adapted to hang over a back portion of the baby stroller, the pocket member is readily accessible to the parent or guardian watching over the stroller. Preferably, two rows of pockets are provided on the hanging portion with each pocket specifically sized and configured to receive one or more of the typical items which may be needed by a small child such as a baby bottle, moist baby wipes or diapers. An open end of each of the pockets is preferably provided with a suitable closure means such as an elastic member or the like.

Additional pockets may be provided on the inside of the hanging portion. An elongated strip of fabric may be attached within one or more of these additional pockets or one of the other pockets provided on the hanging portion. The opposite end of the strip may be attached to a baby toy, pacifier, keys or other object which the child might otherwise discard. When not being used, the toy or pacifier can be stored in the pocket. This feature prevents attached objects from being lost or thrown to an unsanitary location. Alternatively, the strip of fabric may be attached to the inside of the pocket by means of Velcro brand fasteners.

These and other objects and details of the present invention will be more fully understood upon reference to the accompanying drawings.

DETAILED DESCRIPTION OF THE PREFERRED EMBODIMENTS

Figure 2:
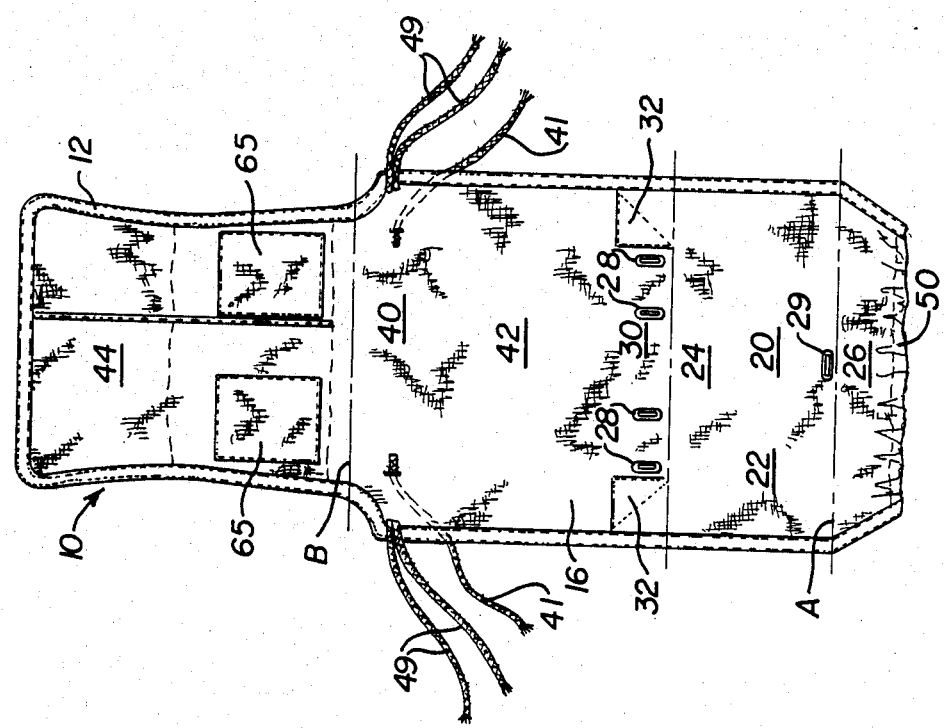
FIG. 2 is a bottom plan view of the organizing apparatus of FIG. 1.
Figure 1:
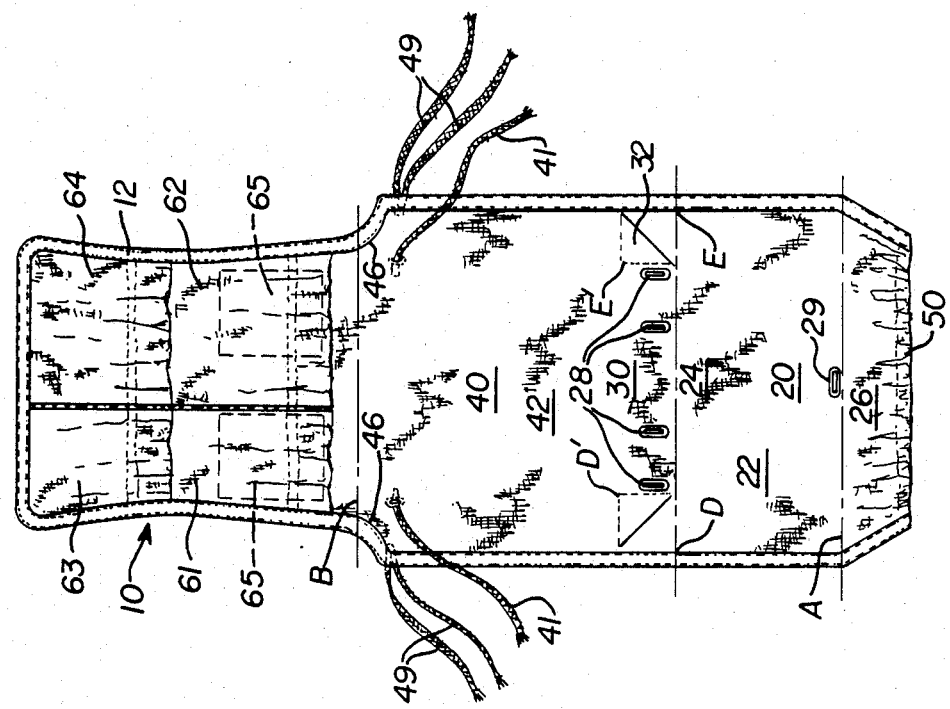
FIG. 1 is a top plan view of a presently preferred embodiment of the organizing apparatus of the present invention.
Figure 3:
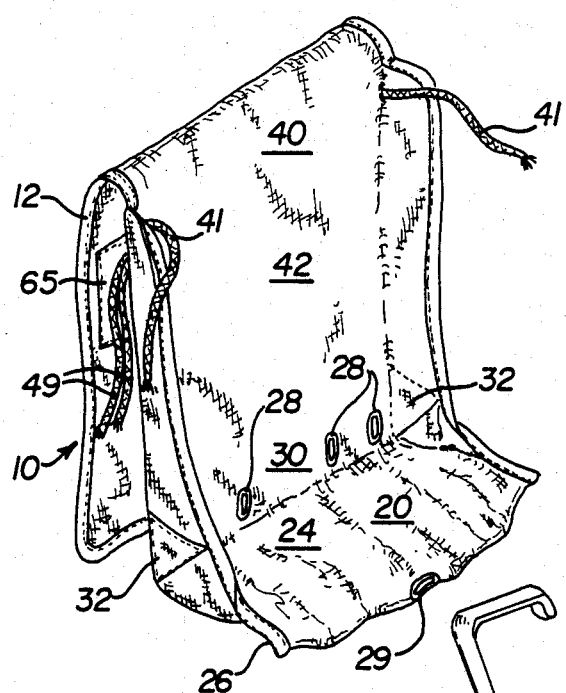
FIG. 3 is a perspective view showing a presently preferred embodiment of the organizing apparatus of the present invention.

Referring to the figures, the presently preferred organizing apparatus of the present invention includes a body 10 formed from a single sheet of quilted fabric. If desired, the body may be formed by sewing or otherwise joining together two or more pieces of any suitable flexible, resilient textile material. A strip 12 can be sewn around the perimeter of body 10 to prevent fraying of the fabric and to provide additional strength and rigidity to the body.

Body 10 has an upper surface 14 and a lower surface 16. Body 10 also includes a seat segment 20 and a back segment 40. A tuck portion 30 of body 10 is provided along the intersection of seat segment 20 and back segment 40 to provide a transition between the adjacent segments. Seat segment 20 has a front portion 22, a rear portion 24 and a front pocket flap 26. Flap 26 is positioned adjacent to front portion 22. A plurality of spaced apart slits 28 are provided in rear portion 24 of seat segment 20 and a slit 29 is provided in front portion 22 to allow for the insertion of a seat belt. Seat segment 20 is generally rectangular and is sized to cover a seat portion 80 of a baby stroller 70 (FIG. 4).

To further prevent undesired movement of seat segment 20, an attachment means, such as pocket flap 26, is provided on the front of the seat segment 20 adjacent to front portion 22. Pocket flat 26 is adapted to be folded along line A onto the bottom surface 16 of front portion 22 to form a pocket member which is adapted to receive the front end of the stroller seat. An elastic member 50 ensures that the pocket will remain snug around the front end of the stroller seat.

Figure 4:
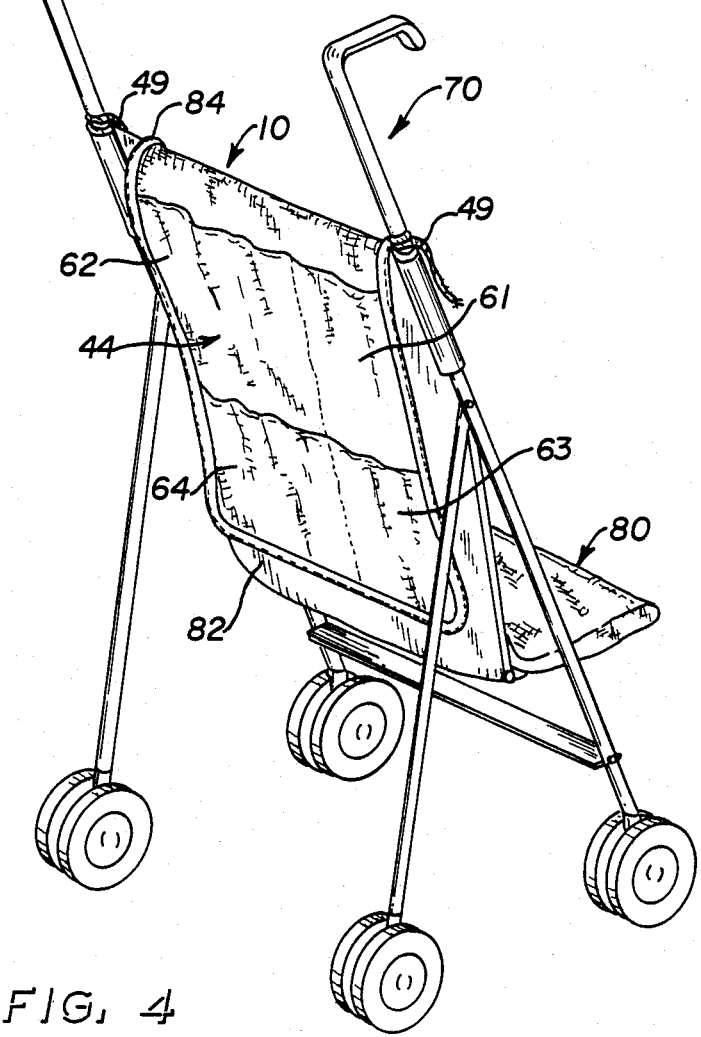
FIG. 4 is a perspective view showing a presently preferred embodiment of the organizing apparatus of the present invention as attached to one form of a baby stroller.

Back segment 40 is generally rectangular and is sized to cover and to hang over a back member 82 of stroller 70 (FIG. 4). Back segment 40 has a hanging portion 44 positioned remote from seat segment 20 and a cover portion 42 positioned adjacent to rear portion 24 of seat segment 20. Hanging portion 44 is narrower than cover portion 42. This allows the back member 82 of stroller 70 to be completely covered while still permitting hanging portion 44 to fit within the bars on the back of the stroller.

Back segment 40 is adapted to be folded on a fold line B which, in use, is positioned to align with an upper end 84 of the back portion 82 of stroller 70. A pair of outwardly extending strap 49 are provided on each side 46 of back segment 40 for use in securing the organizer to the stroller. Preferably the straps 49 are equally spaced apart on opposite sides of fold line B.

The organizing apparatus of the present invention is constructed to provide a plurality of pockets substantially over the rear wheels of the stroller in an easily accessible location. By providing compartments in this manner it is possible to carry far greater loads without disturbing the delicate balance of modern lightweight strollers.

As indicated above a plurality of pockets are provided in hanging portion 44 of back segment 40. Preferably two or more rows of pockets are provided on the upper surface 14 of hanging portion 44 to allow for greater organization of supplies. The pockets are formed by sewing rectangular pieces of material to the back segment. The material may be gathered and an elastic member (not shown) is sewn to an upper end of each pocket to provide a closure means. Pockets 61 and 62 on the top row can be used, for example, for a washcloth, a teething toy and a sheet. Pockets 63 and 64 on the bottom row can be used for a tissue holder and a blanket quilt which may match the fabric of the organizer body. They may also be used for diapers, wipes, bottles, food and the like.

Pockets 61, 62, 63, and 64 are formed by sewing rectangular pieces of material to the upper surface 14 of the back segment 40. These pockets are provided on the upper surface 14 in order to provide ready access to the pockets. In either case, a zipper, elastic member or other suitable closure means is used to securely close these pockets.

As shown in FIG. 2, straps 41 are attached to upper surface 14 of cover portion 42. Straps 41 can be tied to a pacifier or teething toy. The pacifier or teething toy can be stored in hidden pockets 65 which are provided on bottom surface 16 of hanging portion 44 or in any one of pockets 61, 62, 63 and 64.

Tuck portion 30 creates a pre-formed seat in body 10 and causes the body 10 to conform to the overall shape of the stroller. Tuck portion 30 is formed by folding seat segment 20 upon back segment 40 along line C. Side fold points D and E are folded inward onto back segments 40 to points D' and E' respectively to form generally triangular side portions 32. Side portions 32 are sewn onto back segment 40 thereby causing seat segment 20 to extend in a different plane than back segment 40.

While I have described certain presently preferred embodiments of my invention, it is to be distinctly understood that the invention is not limited thereto and may be otherwise variously practiced within the scope of the following claims.

I claim:

1. A removable organizing apparatus for baby strollers and the like comprising a body formed of a flexible and resilient textile material, said body including:
   (a) a generally rectangular seat segment sized to cover a seat of a baby stroller, said seat segment having an upper surface and a lower surface, said seat portion also including a pocket portion including elastic means adapted to receive retain in position a front end portion of a seat of the baby stroller;

(b) a generally rectangular back segment sized to cover and hang down from a back member of a baby stroller, said back segment having an upper surface and a lower surface, said back segment having a hanging portion positioned remote from said seat segment and having a cover portion thereof positioned integrally adjacent to said seat segment, said hanging portion sized and positioned to hang over said back member, said cover portion sized and positioned to cover said back member;

(c) a tuck portion formed at the intersection of said back segment and said seat segment, said tuck portion sized to permit said seat segment to extend in a different plane than said back segment, said tuck portion formed by folding said seat segment upon said back segment forming a fold line having fold points at either end thereof; folding said side points inward onto said back segment to form generally triangular side portions; and then attaching said side portions onto said back segment;

(d) at least one pocket member attached to the hanging portion to provide a plurality of readily accessible back pockets; and (e) a separate strip of fabric attached around a perimeter of said body to prevent fraying of the body fabric and to provide additional strength and rigidity to the body.

2. An apparatus according to claim 1 wherein a plurality of pockets are provided in at least two columns of pockets on said hanging portion.

3. An apparatus according to claim 1 wherein said apparatus and said pockets are formed of a quilted material.

4. An apparatus according to claim 1 further comprising attaching means, said attachment means provided on said seat segment to retain said seat member against said stroller.

5. An apparatus according to claim 1 further comprising strap means attached to said cover portion and said seat segment.

6. An apparatus according to claim 1 further comprising hidden pockets provided on said lower surface of said hanging portion.

* * * * *